Feb. 10, 1970   W. VOIGTLÄNDER   3,494,268
PHOTOGRAPHIC CAMERA HAVING A FLASHCUBE SOCKET
Filed Nov. 6, 1967

WALTER VOIGTLÄNDER
INVENTOR.

BY
ATTORNEYS

United States Patent Office 3,494,268
Patented Feb. 10, 1970

3,494,268
PHOTOGRAPHIC CAMERA HAVING A FLASHCUBE SOCKET
Walter Voigtländer, Stuttgart-Heumaden, Germany, assignor to Eastman Kodak Company, Rochester, N.Y., a corporation of New Jersey
Filed Nov. 6, 1967, Ser. No. 680,673
Claims priority, application Germany, Jan. 28, 1967, K 56,674
Int. Cl. G03b *19/00;* F21v *19/04*
U.S. Cl. 95—11      4 Claims

ABSTRACT OF THE DISCLOSURE

A flashcube socket assembly having a rotatable socket, a socket transport mechanism and a reciprocatable member connecting the transport mechanism to the socket to rotate the socket in one direction. The reciprocatable member consists of a resilient leaf spring having a free end operatively engaging a ratchet formed on the socket and having an integral lug cooperating with a fixed stop to prevent socket rotation in the opposite direction.

BACKGROUND OF THE INVENTION

Field of invention

This invention relates to photographic devices and more particularly to a photographic camera having a rotatable socket for receiving a cubic flash unit or flashcube containing several flashbulbs to successively place the bulbs in a flash operating position.

Description of the prior art

Cameras of this type have become known. The socket for receiving such flashcubes usually is mechanically coupled with the film transport mechanism of the camera for rotation in a predetermined direction. In such cameras having a more simple design, it is not always ensured that the socket is held in its predetermined position of rotation for flash ignition. Other cameras are provided with specific means to secure the socket in a flash ignition position for flash operation as well as to prevent rotation of the socket against the direction of transport. In addition to space being necessary for accommodating these additional specific means, an increase in manufacturing costs and complexity also may be incurred.

SUMMARY OF INVENTION

The present invention eliminates many of the problems of these known cameras in a simple manner. According to the invention, a photographic camera is provided with a rotatable socket to receive a flash unit containing several flashbulbs which are successively positioned at a flash location by a socket transport mechanism. The socket rotating member which connects the socket with the transport mechanism comprises an elastic material and is provided with an integral lug cooperating with a fixed camera stop for preventing rotation of the socket against the direction of rotation by the transport mechanism. Thus, the camera operator is prevented, without any required additional parts, from moving the flash unit against the direction of transport, and thus, possible damage to the transport device or to other parts connected with the socket may be avoided.

BRIEF DESCRIPTION OF THE DRAWING

The invention as well as objects and advantages thereof will become more apparent in the course of the following description of a preferred embodiment, the accompanying drawing forming a part thereof, in which.

DESCRIPTION OF THE PREFERRED EMBODIMENT

Flashcube cameras with rotatable flashcube sockets are generally known, and in view of this, the present invention will be described by reference only to those parts of a camera directly related to a required understanding of the invention.

Figure 1:
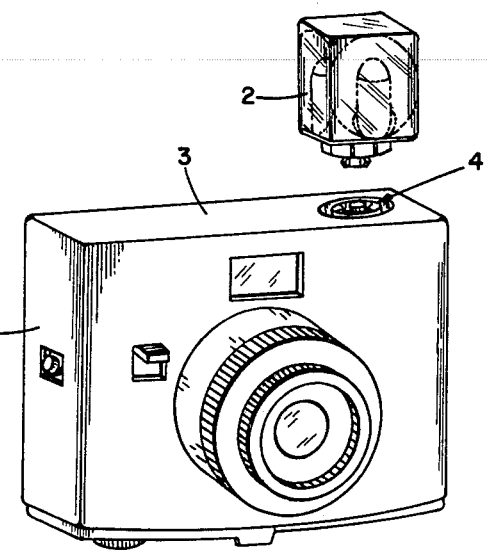
FIGURE 1 is a perspective view of a camera suitably incorporating the present invention.
Figure 2:
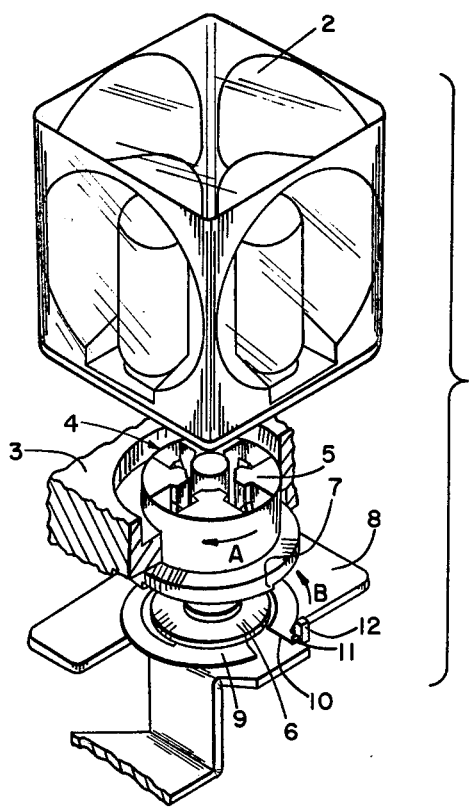
FIGURE 2 is a perspective view of the socket transport assembly and flash unit according to the present invention.

As shown in FIGURE 1, a camera 1 incorporating the invention to receive a flash unit or flashcube 2 may comprise a top wall 3 at which is located a socket assembly 4 for attaching the flashcube 2.

The socket assembly 4 includes a socket part 5 that is rotatably seated in a bearing guide portion defined by top wall 3. In addition to the known flashcube receiving-holding means and circuit means associated with the flashcube base and located at the upper portion of socket part 5, the bottom portion of the socket part 5 is provided with a ratchet face having a plurality (four) of pawl engaging projections 7 equal to the number of flash operating positions of the socket part 5.

A rotatable reciprocating disk 6 is coupled with the film transport mechanism by means of a known mechanical linkage such as a rod and pin connection to reciprocate disk 6 ninety degrees in its plane with each actuation of the film transport handle (not shown). Disk 6 is supported by a mechanism plate 8 that is within and stationary in relation to the camera housing.

A transport member 9 is secured to disk 6 at one end and is designed as an annular leaf spring surrounding the disk. Member 9 at its other end includes an upwardly extending resilient pawl or shoulder 10 which abuts against the bottom surface of socket part 5. Shoulder 10 further is furnished with a lug 11 projecting beyond the periphery of socket 5 and cooperating with a stop 12 forming part of the plate 8 at an angular portion of the plate as shown.

The preferred embodiment of the invention operates in the following manner:

The flash unit or flashcube 2 is attached by inserting its base into socket part 5 and is retained therein by the known holding means. Shoulder 10 of transport member 9 is located in front of and engages one of the projections 7, and socket part 5 is held in position by a known spring detent (not shown) to locate one bulb of the flashcube at the firing location. After camera operation, the film transport mechanism is actuated. Actuation of the film transport mechanism causes the transport member 9, which is connected with disk 6 to move with the disk as the disk reciprocates first by rotating clockwise (looking down) ninety degrees and then counterclockwise to the position shown as the transport handle is returned to its original position. Shoulder 10 during the clockwise rotation of member 9 overcomes the spring detent and turns socket part 5, in the clockwise direction (direction of arrow A) the same ninety degrees, in which ninety degree position the socket part 5 again is held by the spring detent. When the film transport handle is returned to its initial position, disk 6 being mechanically linked thereto is turned in the direction of arrow B, turning with it the transport coupling member 9. In the course of this process, shoulder 10 slides along bottom of part 5 in a resilient and yielding manner until it engages the next projection 7. In this position, lug 11 is in the vicinity of the fixed stop 12. In case the camera operator should try to turn the flash unit 2 contrary to the direction of normal rotation (in a counterclockwise direction), which would cause damage to the transport mechanism, lug 11 strikes against stop 12 to prevent such rotation. Clockwise rotation of socket part 5 by the operator is permitted because in that instance shoulder 11 yields during the rotation.

As is now evident, this simple structure in which member 9 serves as the transport coupling and safety means allows a less expensive manufacture, while at the same time offering complete reliability. A manual turning of the flash unit 2 independent of the film transport mechanism, which might become necessary when a partly used flash unit is inserted, can be effected in the direction of automatic rotation (direction of arrow A) but not in the opposite direction.

The invention has been described in detail with particular reference to a preferred embodiment thereof, but it will be understood that variations and modifications can be effected within the spirit and scope of the invention as described hereinabove and as defined in the appended claims.

I claim:
1. A photographic device comprising:
    a housing,
    a socket rotatable relative to the housing to receive a flash unit containing several flashbulbs successively connectable to a flash synchronizer,
    a flash socket transport mechanism,
    a socket transport member operatively connecting the transport mechanism to the socket to rotate the socket in a predetermined direction, the transport member comprising a resilient member fixed to one and operatively engaging the other of said socket and said transport mechanism,
    lug means fixed to said transport member, and
    stop means fixed with respect to said housing engageable with the lug means to prevent rotation of the socket in a direction contrary to the predetermined direction.

2. A camera according to claim 1, wherein the socket comprises a plurality of projections and the transport member comprises a leaf spring having a shoulder cooperating directly with the projections.

3. A camera according to claim 2, wherein the shoulder includes an extended portion forming the lug means.

4. A camera according to claim 1, wherein the transport mechanism includes a reciprocatable disk and the transport member comprises an annular leaf spring having one end fixed to the disk for reciprocation therewith and another end yieldably engaging the socket.

References Cited

UNITED STATES PATENTS

| | | | |
|---|---|---|---|
| 2,258,575 | 10/1941 | MacKay | 240—37.1 |
| 3,353,468 | 11/1967 | Beach | 95—11.5 |
| 3,447,435 | 6/1969 | Winkler | 95—11.5 |

NORTON ANSHER, Primary Examiner

F. L. BRAUN, Assistant Examiner

U.S. Cl. X.R.

240—37.1